(12) United States Patent
Cole et al.

(10) Patent No.: US 9,746,628 B2
(45) Date of Patent: Aug. 29, 2017

(54) ACTIVE OPTICAL CABLE ASSEMBLY INCLUDING OPTICAL FIBER MOVEMENT CONTROL

(71) Applicant: 3M INNOVATIVE PROPERTIES COMPANY, St. Paul, MN (US)

(72) Inventors: Brian M. Cole, Austin, TX (US); Donald G. Doss, Round Rock, TX (US); Terry L. Smith, Roseville, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 190 days.

(21) Appl. No.: 14/359,243

(22) PCT Filed: Nov. 8, 2012

(86) PCT No.: PCT/US2012/064090
§ 371 (c)(1),
(2) Date: May 19, 2014

(87) PCT Pub. No.: WO2013/081795
PCT Pub. Date: Jun. 6, 2013

(65) Prior Publication Data
US 2014/0341515 A1    Nov. 20, 2014

Related U.S. Application Data

(60) Provisional application No. 61/565,132, filed on Nov. 30, 2011.

(51) Int. Cl.
*G02B 6/42* (2006.01)
*G02B 6/36* (2006.01)
*G02B 6/43* (2006.01)

(52) U.S. Cl.
CPC ............. *G02B 6/43* (2013.01); *G02B 6/3644* (2013.01); *G02B 6/428* (2013.01); *G02B 6/4219* (2013.01); *G02B 6/4284* (2013.01); *G02B 6/4214* (2013.01)

(58) Field of Classification Search
CPC ........................... G02B 6/3644; G02B 6/4219
See application file for complete search history.

(56) References Cited

U.S. PATENT DOCUMENTS

| 4,779,674 A | 10/1988 | McNulty |
| 5,896,480 A | 4/1999 | Scharf |
| (Continued) | | |

FOREIGN PATENT DOCUMENTS

| CA | 2216759 | 4/1998 |
| CN | 24708443 | 1/2002 |
| (Continued) | | |

OTHER PUBLICATIONS

International Search Report for PCT International Application No. PCT/US2012/064090 mailed on May 31, 2013, 6 pages.

*Primary Examiner* — Jerry Rahll
(74) *Attorney, Agent, or Firm* — Clifton F. Richardson

(57) ABSTRACT

A plug connector for connecting optical fibers to an electrical receptacle connector includes a housing defining a cavity therein. At least one printed circuit board (PCB) is disposed in the housing cavity. The PCB includes one or more optoelectronic components disposed on its top surface and electrical contacts disposed proximate a mating edge of the PCB for mating with the receptacle connector. The electrical contacts are electrically connected to the one or more optoelectronic components. One or more optical fibers enter the housing cavity through a housing opening and are optically coupled to the optoelectronic components. A structure comprising a top surface is disposed within the housing cavity between the housing opening and the PCB. The (Continued)

plurality of the optical fibers extends over the top surface of the structure and over at least a portion of the top surface of the PCB. The plurality of the optical fibers is separated from the top surface of the PCB by a first minimum distance and from the top surface of the platform by a second minimum distance less than the first minimum distance.

26 Claims, 8 Drawing Sheets

(56) References Cited

U.S. PATENT DOCUMENTS

| | | |
|---|---|---|
| 6,129,561 A | 10/2000 | Lok |
| 6,830,382 B1 | 12/2004 | Deane |
| 6,994,478 B1 | 2/2006 | Chiu |
| 2001/0009599 A1 | 7/2001 | Kato et al. |
| 2004/0101259 A1 | 5/2004 | Kilian |
| 2005/0178568 A1 | 8/2005 | Ito |
| 2007/0071390 A1 | 3/2007 | Tobiason |
| 2007/0232118 A1 | 10/2007 | Wu |
| 2009/0297099 A1 | 12/2009 | Benjamin |
| 2010/0027955 A1 | 2/2010 | Parikh |
| 2010/0080518 A1 | 4/2010 | Teo |
| 2011/0123150 A1 | 5/2011 | Zbinden et al. |
| 2011/0293227 A1* | 12/2011 | Wu ...................... G02B 6/3817 385/101 |

FOREIGN PATENT DOCUMENTS

| | | |
|---|---|---|
| EP | 0245195 | 11/1987 |
| EP | 0389829 | 10/1990 |
| JP | 2001-094273 | 4/2001 |
| JP | 2007-163604 | 6/2007 |
| WO | WO 98-40774 | 9/1998 |
| WO | WO 2011-056733 | 5/2011 |
| WO | WO 2013-082013 | 6/2013 |

* cited by examiner

US 9,746,628 B2

ACTIVE OPTICAL CABLE ASSEMBLY INCLUDING OPTICAL FIBER MOVEMENT CONTROL

BACKGROUND

As compared with traditional wire-based networks, optical-fiber communication networks are capable of transmitting significantly more information at significantly higher speeds. Optical fibers, therefore, are being increasingly employed for communication networks. In most electronic devices, digital signals are generated and transmitted as electrical signals on conductive wires or circuit board traces. For transmission of high speed signals over long distances, conversion of the electrical signals to optical signals is often performed, to allow low-loss transmission over optical fibers or waveguides. The electrical-to-optical conversions, and eventual optical-to-electrical conversions, are performed using a transceiver which contains optical sources and detectors, as well as electronic control and logic circuitry. In many optical transmission system embodiments, the transceiver is a stand-alone module having an electrical connector interface and an optical connector interface.

SUMMARY

Some embodiments involve a plug connector for connecting optical fibers to an electrical receptacle connector. The plug connector includes a printed circuit board (PCB) comprising a plurality of electrical contacts disposed proximate a mating edge of the PCB for mating with the receptacle connector. A transceiver is disposed in the housing cavity, the transceiver including one or more optoelectronic components disposed on a surface of the PCB and electrically connected to the plurality of electrical contacts. The plug connector includes a housing having, a housing cavity, a housing opening, and a platform disposed within the housing cavity between the housing opening and the PCB, the platform comprising a top surface. One or more optical fibers enter the housing cavity through the housing opening and are optically coupled to the optoelectronic components. The plurality of the optical fibers extends along the top surface of the platform and along at least a portion of the top surface of the PCB. The plurality of optical fibers being separated from the top surface of the PCB by a first minimum distance and from the top surface of the platform by a second minimum distance less than the first minimum distance.

If an optical fiber of the one or more optical fibers expands toward the top surface of the platform and the PCB, the optical fiber contacts the top surface of the platform before the optical fiber contacts an edge of the PCB closest to the platform. For example, the edge of the PCB closest to the platform can be the edge opposite the mating edge of the PCB. The optical fibers in the plurality of optical fibers float within the housing cavity between the housing opening and the optoelectronic component.

In some implementations, the housing further comprises opposing side walls disposed in the housing cavity and on either side of the top surface of the platform. The opposing side walls extend along a length of the plug connector and diverge from each other along a direction away from the top surface of the platform. In this configuration, the optical fibers are disposed in a space defined between the opposing side walls.

According to some aspects, the optoelectronic component may be adapted to convert an optical signal to an electrical signal, an electrical signal to an optical signal, or both. For example, the optical fibers in the plurality of optical fibers can be multi-transverse-mode optical fibers, or single-transverse mode optical fibers, depending on the nature of the optoelectronic components and the performance requirements.

Some embodiments involve an optoelectronic system comprising a plug connector. The plug connector includes a housing defining a cavity therein. A printed circuit board (PCB) is disposed in the housing cavity. The PCB includes an optoelectronic component disposed on a top surface of the PCB and a first plurality of electrical contacts disposed proximate a mating edge of the PCB for mating with the receptacle connector. The first plurality of electrical contacts is electrically connected to the optoelectronic component. A plurality of optical fibers enters the housing cavity through a housing opening and the optical fibers are optically coupled to the optoelectronic component. A platform disposed within the housing cavity between the housing opening and the PCB, the platform comprising a top surface. The plurality of the optical fibers extends along the top surface of the platform and along at least a portion of the top surface of the PCB, the plurality of the optical fibers being separated from the top surface of the PCB by a first minimum distance and from the top surface of the platform by a second minimum distance less than the first minimum distance. The optical fibers in the plurality of optical fibers are multi-transverse-mode optical fibers. The optoelectronic system further includes a multi-transverse-mode laser emitting light into at least some of the optical fibers in the plurality of optical fibers. For example, the laser may comprise a vertical cavity surface emitting laser.

Some embodiments include a plug connector for connecting an optical fiber cable to an electrical receptacle connector. The plug connector includes a housing defining a cavity therein. A printed circuit board (PCB) is disposed in the housing cavity and comprises an optoelectronic component. A fiber optic cable enters the housing cavity through a housing opening and is optically coupled to the optoelectronic component. The cable includes at least one optical fiber comprising a core surrounded by a cladding and an outer jacket surrounding the at least one optical fiber. The cable is configured such that the at least one fiber can move longitudinally with respect to the cable jacket when a small force is applied between them (an example of a so-called "loose tube" cable design). The cable is attached to the housing at the housing opening such that the outer jacket, but not the at least one optical fiber, is prevented from moving along a longitudinal axis of the cable. The optoelectronic component may be disposed on a top surface of the PCB.

For example, when the cable is pulled with a maximum rated cable load along the longitudinal axis of the cable, the at least one optical fiber experiences substantially zero tensile stress. The at least one optical fiber floats within the housing cavity between the housing opening and the optoelectronic component.

In some configurations, the cable comprises a plurality of optical fibers, each optical fiber comprising a core surrounded by a cladding and an outer jacket surrounding the plurality of optical fibers. The cable is attached to the housing at the housing opening such that the outer jacket, but not the optical fibers in the plurality of optical fibers, is prevented from moving along a longitudinal axis of the cable. For example, when the cable is pulled with a maximum rated cable load along the longitudinal axis of the cable, the optical fibers in the plurality of optical fibers experience substantially zero tensile stress.

Some embodiments involve a plug connector for connecting an optical fiber cable to an electrical receptacle connector. The plug connector includes a housing and a printed circuit board disposed in the housing cavity. The housing includes opposing top and bottom walls and opposing outer side walls, the top, bottom and outer side walls defining a cavity therebetween. The printed circuit board (PCB) includes an optoelectronic component and a first plurality of electrical contacts disposed proximate a mating edge of the PCB for mating with the electrical receptacle connector, the first plurality of electrical contacts being electrically connected to the optoelectronic component. The plug connector also includes a plurality of optical fibers disposed in the housing cavity and extending along a length of the housing from a housing opening to the optoelectronic component, the plurality of optical fibers being optically coupled to the optoelectronic component. First opposing inner side walls are disposed in the housing cavity between the opposing outer side walls and on the bottom wall, the first opposing inner side walls diverging from each other in a direction from the bottom wall to the top wall. Second opposing inner side walls are disposed in the housing cavity between the opposing outer side walls and on the top wall, the second opposing inner side walls diverging from each other in a direction from the top wall to the bottom wall. The first opposing inner side walls overlap the second opposing inner side walls and the first and second opposing inner side walls define a guiding space therebetween. The plurality of the optical fibers are disposed in the guiding space.

The optoelectronic component can be disposed on a top surface of the PCB. According to some aspects, the optical fibers in the plurality of optical fibers float in the housing cavity between an opening of the housing and the optoelectronic component. When a fiber in the plurality of optical fibers expands in the housing cavity, the first and second opposing side walls cooperatively guide the expanding optical fiber towards the top wall of the housing. In some cases, the first opposing inner side walls terminate at a first surface raised relative to an inner side of the bottom wall of the housing. The first surface may include a planar portion extending below and parallel to the optical fibers in the plurality of the optical fibers.

The first opposing inner side walls may extend along the length of the housing between the housing opening and the PCB. The second opposing inner side walls may extend along the length of the housing between the housing opening and the optoelectronic component.

In some configurations, the second opposing inner side walls terminate at a second surface disposed on an inner side of the top wall of the housing, the second surface having a curved portion curving along the plurality of the optical fibers. A radius of curvature of the curved portion of the second surface can be greater than the minimum bend radius of curvature for the optical fibers in the plurality of the optical fibers.

The above summary of the present invention is not intended to describe each disclosed embodiment or every implementation. The figures and detailed description that follow below exemplify various illustrative embodiments.

DESCRIPTION

A fiber optic cable, having transceivers integrated into electrical plug connectors on either end, is described herein as an Active Optical Cable. The Active Optical Cable (AOC), presenting a plug connector on either end, has an appearance similar to a conventional connectorized electrical cable, and can be a drop-in replacement for an electrical cable, but provides fiber optic performance. In order to integrate the transceiver into the AOC, the electrical plug connector includes a housing defining a cavity therein. Optical fiber cables are designed to carry large amounts of information at high speeds. Each optical fiber cable may include one or more optical fibers that act as waveguides for the optical signal. To transmit information via the optical fiber cables, electrical signals are converted to optical signals at the transmit end, and then are converted back from optical signals to electrical signals at the receive end. The electrical-to-optical and optical-to-electrical conversions are handled by a transceiver that includes optoelectronic components configured to perform the conversions. In some configurations, the transceiver includes one or more optoelectronic components mounted on one or more printed circuit boards housed within an optical connector.

Figure 1A:
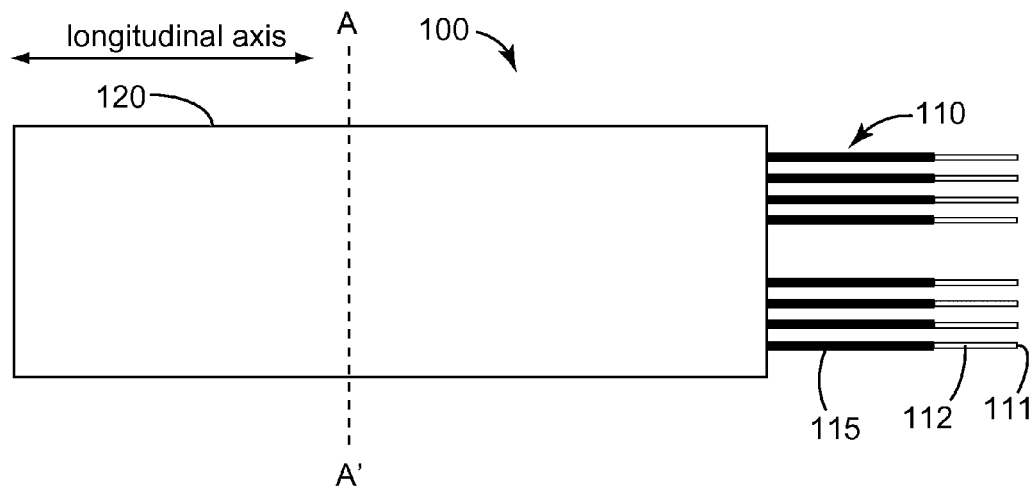
FIGS. 1A and 1B provide top and cross section views, respectively, of an optical fiber cable.
Figure 1B:
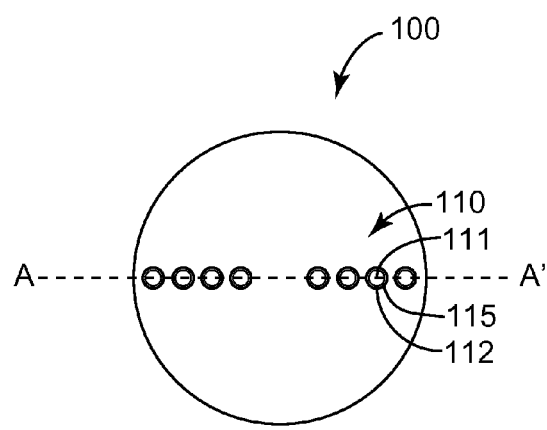

FIGS. 1A and 1B provide top and cross section views, respectively, of an optical fiber cable 100. In this example, the optical fiber cable 100 includes eight optical fibers 110. Each optical fiber 110 includes a core 111 surrounded by a cladding 112 and buffer coating 115. The optical fibers 110 are disposed within an outer jacket 120, and in some cases, the fibers 110 are moveable along the longitudinal axis within the jacket 120. In some configurations, the one or more fibers 110 may be loose within the outer jacket 120, meaning that the optical fibers 110 can move longitudinally and laterally within the outer jacket 120. In loose cable configurations, the fibers may have a more random alignment than the alignment of the idealized diagrams of FIGS. 1A and 1B.

Figure 2A:
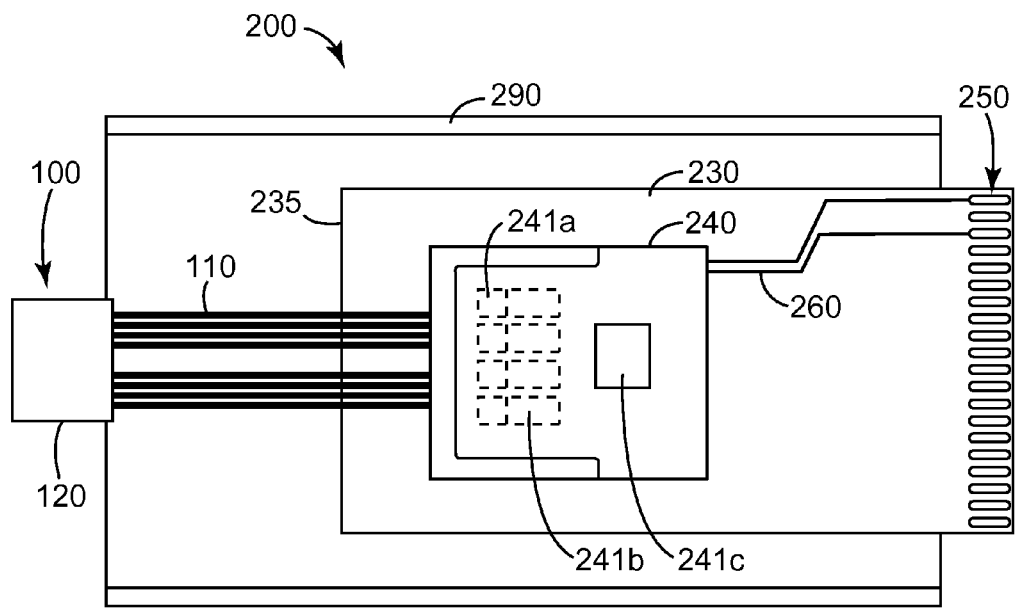
FIGS. 2A and 2B are top and cross section views, respectively, of an optical subassembly that includes an optical cable coupled to an optoelectronic component 240 which is mounted on a printed circuit board (PCB) in accordance with some embodiments.
Figure 2B:
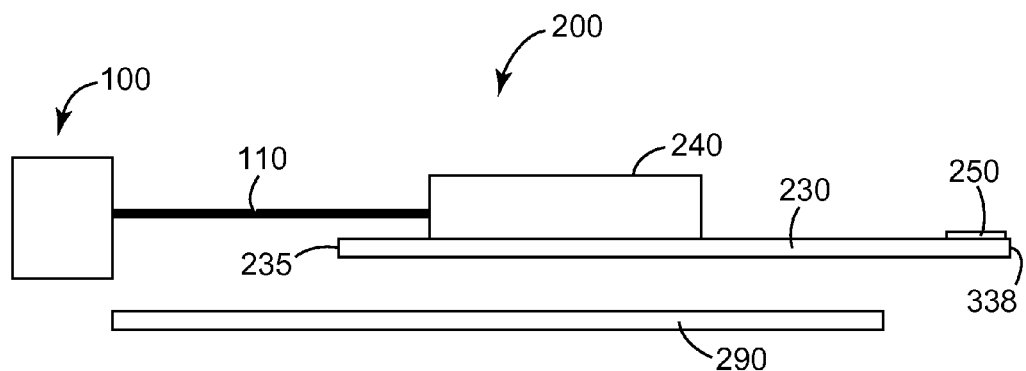

FIGS. 2A and 2B are top and cross section views, respectively, of portions of an optical cable 100 and a connector 200. The optical cable is coupled to a transceiver 240 (also denoted an optical engine) within the connector 200. The transceiver 240 may include one or more components 241 such as optical coupling components 241a for guiding the light beam, optoelectronic components 241b, such as light emitting and/or detecting devices, and one more electronic components, such as an application specific integrated circuit (ASIC) 241c. The components 241 of the transceiver 240 are mounted on a printed circuit board (PCB) 230. The connector 200 includes a housing 290 in which the PCB is mounted. Optical signals are transmitted through the optical fibers 110 of the optical fiber cable 100 to the transceiver 240 within the connector 200. The transceiver 240 converts optical signals to electrical signals, and/or vice versa. The electrical signals are carried through conductive traces 260 on the PCB to electrically conductive edge connector pads 250 arranged along a mating edge 338 of the PCB. The edge connector pads 250 can be connected to additional electrical circuitry by inserting the edge connector pads 250 of the PCB board 230 into a socket of a receptacle connector configured to receive the edge connector pads 250.

The individual optical fibers 110 are relatively fragile and can break, particularly when strained and/or when exposed to sharp edges or abrasive surfaces. Although the individual optical fibers 110 are relatively protected by the fiber protective coating 115, the optical fibers 110 are exposed within the connector housing 290, e.g., in the region where they are coupled to the optoelectronic component 240.

Movement of the optical fiber cable 100, such as longitudinal and/or lateral movement of the optical fibers 110, can cause the optical fibers 110 to bend, bringing the fibers into contact with abrasive or sharp features, such as the surface of the PCB 230 or the PCB edge 235. Abrasion of the fiber protective coatings 115 by the PCB 230 and/or PCB edge 235 may expose the glass core 111 reducing the reliability of optical fiber cables. Embodiments discussed herein involve optical fiber connector configurations and/or features disposed within an optical fiber connector housing that control the movement of optical fibers. The movement control features reduce the amount of tensile stress applied to the optical fibers and/or control the movement of the optical fibers to avoid contact with sharp or abrasive features that could contribute to fiber breakage. For example, the movement control features discussed herein may allow for one or both of longitudinal and lateral movement of the fibers within the housing cavity while constraining the movement to a maximum amount.

Figure 3:
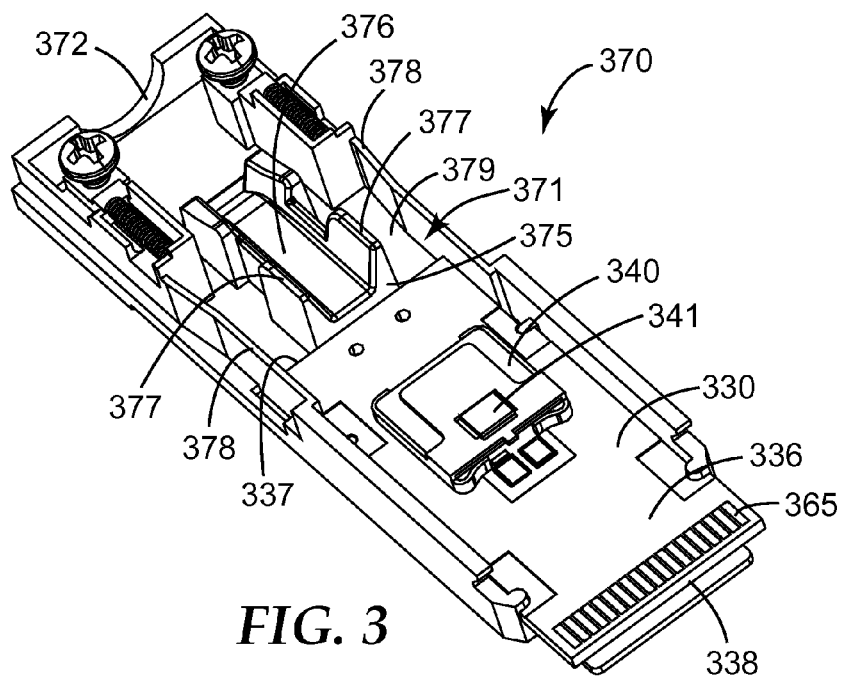
FIGS. 3 through 5 illustrate portions of an optical fiber connector. In this case, the connector is an electrical plug connector configured to mate with a complementary electrical receptacle connector in accordance with various embodiments discussed herein.
Figure 4:
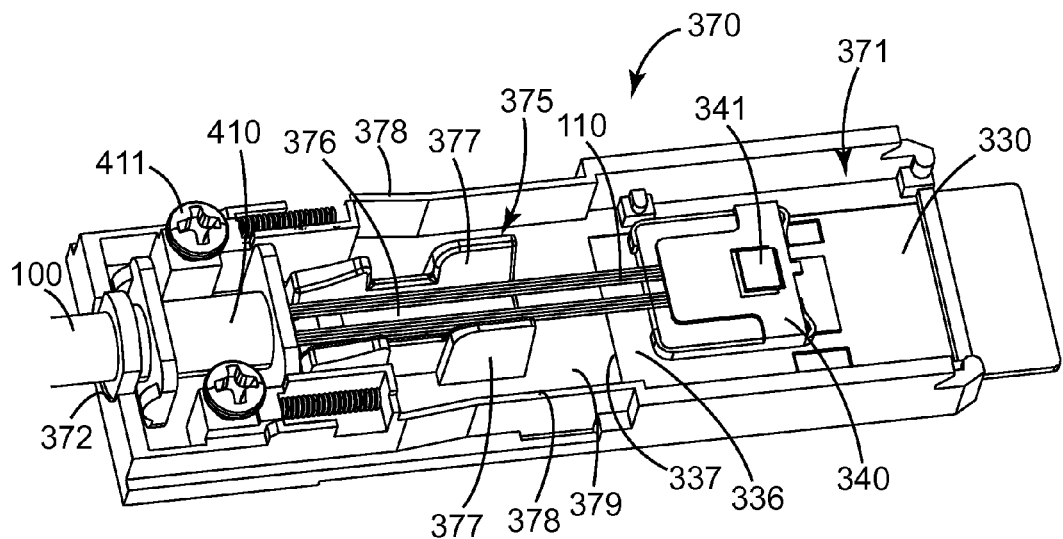
Figure 8:
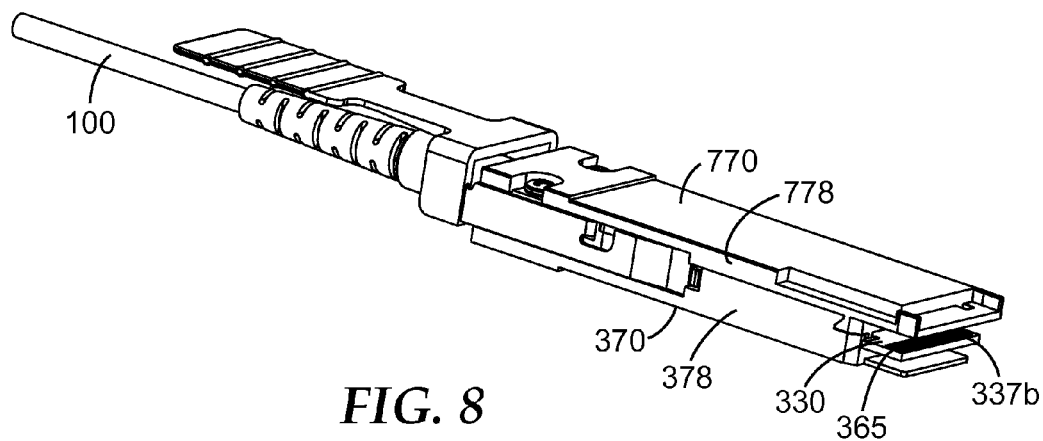
FIG. 8 provides a view of the plug connector including the bottom housing portion, the top housing portion, and the optical fiber cable according to some embodiments.

FIGS. 3 through 5 illustrate portions of an optical fiber connector. In this case, the connector is a plug connector configured to mate with a complementary receptacle connector. FIGS. 3 and 4 show different isometric views of a bottom portion 370 of a plug connector housing. FIGS. 5A and 5B show cross sectional views of the bottom portion 370 of the housing. As best seen in FIG. 8, the plug connector housing includes a bottom portion 370 which can be assembled with a top portion 770 of the plug connector housing. The terms "bottom" and "top" are used herein as convenient terms for describing portions of the housing and various components disposed relative to the housing. However, it will be appreciated that these terms not meant to specify any particular orientation of the connector housings or components. For example, in some orientations, the housing portion designated as "bottom" may actually be on top of, or to the left or right side of, the housing portion designated as "top," etc. The views of the bottom housing 370 shown in FIGS. 4 and 5 illustrate the optical fibers 110 disposed within the housing, whereas the view of the bottom housing 370 shown in FIG. 3 does not include the optical fibers 110.

As shown in FIGS. 3 through 5, a transceiver 340, includes components 341, e.g., optical, optoelectronic, and/or electronic components mounted on the PCB 330. The PCB is disposed within the cavity 371 of the housing 370. A first plurality of electrical contacts 365, shown in FIGS. 3 and 5, is disposed proximate a mating edge 338 of the PCB 330. The electrical contacts 365 are electrically coupled to the transceiver 340 through traces disposed on the PCB 330. The electrical contacts 365 are configured for mating with socket electrical contacts of a receptacle connector.

An opening 372 in the housing 370, as is best seen in FIG. 3, is configured to allow entry of optical fibers 110. If optical fibers 110 are present within the housing 370, they may be optically coupled to one or more transceiver components 341 disposed on the PCB 330. In some configurations, a structure 375 is disposed within the housing cavity 371 between the housing opening 372 and the PCB 330. When present in the optical cavity 371, the optical fibers 110 extend along the top surface 376 of the structure 375 and along a top surface 336 of at least a portion of the PCB 330. The optical fibers 110 float within the housing cavity 371 between the housing opening 372 and the transceiver 340.

Under some circumstances, the optical fibers 110 can sag or expand into the housing cavity 371. The structure 375 has at least one surface 376 that limits the movement of the optical fibers 110 in the cavity 371. Absent the structure 375, the sagging/expansion may cause the optical fibers 110 to come into contact with the PCB 330 such as at the PCB edge 337. The structure 375 may take on various forms as discussed in connection with FIGS. 5-6 below and is configured to maintain a predetermined spatial relationship between the optical fibers 110 and the PCB 330 that reduces the chance contact between the optical fibers 110 and the PCB 330. For example, the structure 375 may be configured to limit movement of the optical fibers 110 toward the PCB 330 in the region between the housing opening and the PCB. The optical fibers 110 are separated from the top surface 336 of the PCB 330 by a first minimum distance and are separated from the top surface 376 of the structure 375 by a second minimum distance which is less than the first minimum distance.

Figure 5A:
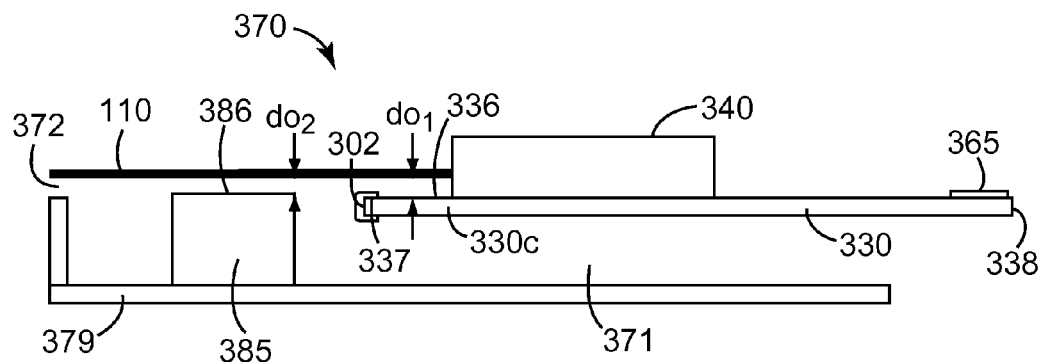

The structure can take on any convenient shape. For example, in some embodiments, as seen in FIG. 5A, the structure comprises a platform 385. In FIG. 5A, the fibers 110 are arranged in a substantially flat configuration, exhibiting substantially no arc within the connector. In this straight configuration, the optical fibers 110 are separated from the top surface 336 of the PCB 330 by a first minimum distance, $d0_1$, and are separated from the top surface 386 of the platform 385 by a second minimum distance, $d0_2$, where $d0_2$ is less than $d0_1$. The platform surface 386 may have rounded or chamfered edges. As also illustrated in FIG. 5A, the optical fibers 110 may be arranged in the cavity 371 to be relatively straight or parallel with the bottom surface of the housing 370. In the configuration shown in FIG. 5A, as the optical fiber 110 expands or moves towards the top surface 386 of the platform 385 and the top surface 336 of the PCB 330, the optical fiber 110 contacts the top surface 386 of the platform 385 before contacting the edge 337 or surface 336 of the PCB 330. For example, the platform 385 may be about 16 mm long, 3.25 mm in width and about 3 mm high. In various embodiments, $d0_1$ may be about 0.750 mm+/−0.100 mm and $d0_2$ may be about 0.500+/−0.100 mm. Optionally, in some implementations, the 337 edge of the PCB 330 may be rounded or chamfered and/or the edge 337 may be covered with a bumper 302 or encapsulant to avoid abrasion of the optical fibers 110.

Figure 5B:
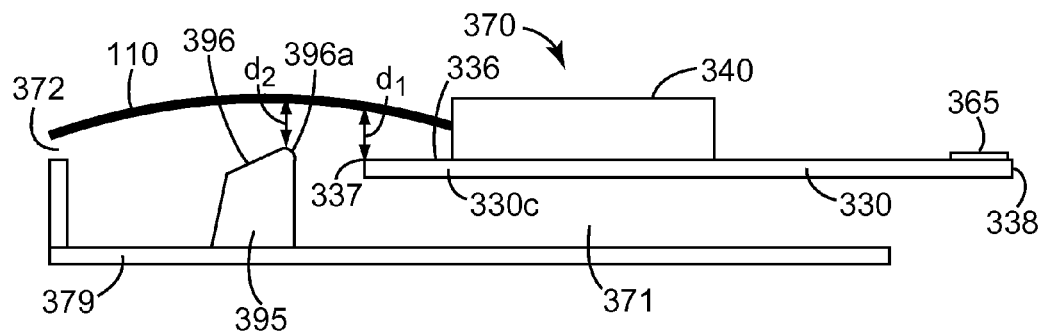
Figure 5C:
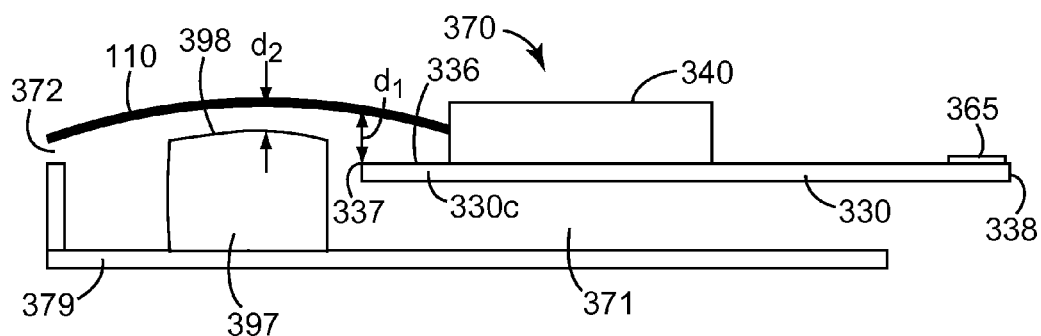
Figure 5D:
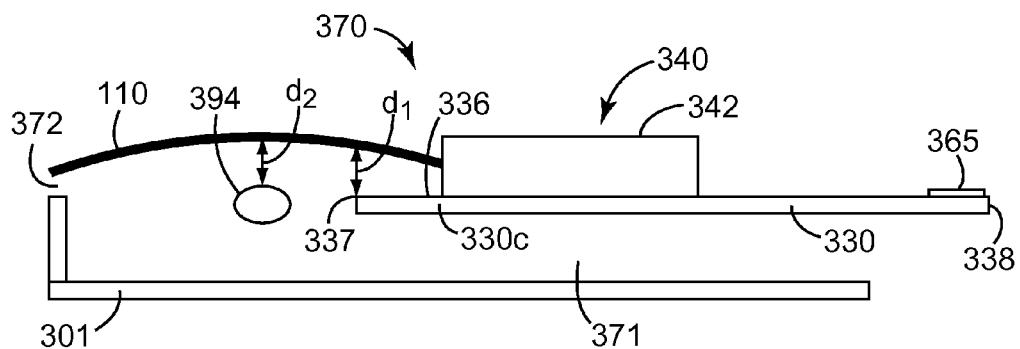

In some embodiments, as illustrated in FIG. 5B, the structure may comprise a platform or ridge 395 having a ramp surface 396 and/or a rounded front edge 396a. In many cases, as shown in FIGS. 5B-5E, the optical fibers 110 are disposed in the cavity 371 curving upward, away from the lower wall 379 of the bottom housing 370, in the distance between the opening 372 and the transceiver 340. When the optical fibers are arced, the optical fibers are separated from the top surface of the PCB by a first minimum distance, $d_1$, and are separated from the top surface of the movement control feature by a second minimum distance. In some cases, $d_2$ is less than $d_1$. The span of the optical fibers in the housing between the opening 372 and the transceiver 340 may be about 28 mm with the optical fiber curvature ranging from a straight configuration to 15 mm radius. In some cases, as illustrated in FIG. 5C, the platform 397 may have a top surface 398 that is formed to have a curve similar to a desired curve of the optical fibers 110 within the cavity 371. The fibers 110 may or may not contact the surface 398. As shown in FIG. 5D, the structure may comprise a bar 394 that is supported by side walls of the bottom housing portion 370.

Figure 5E:
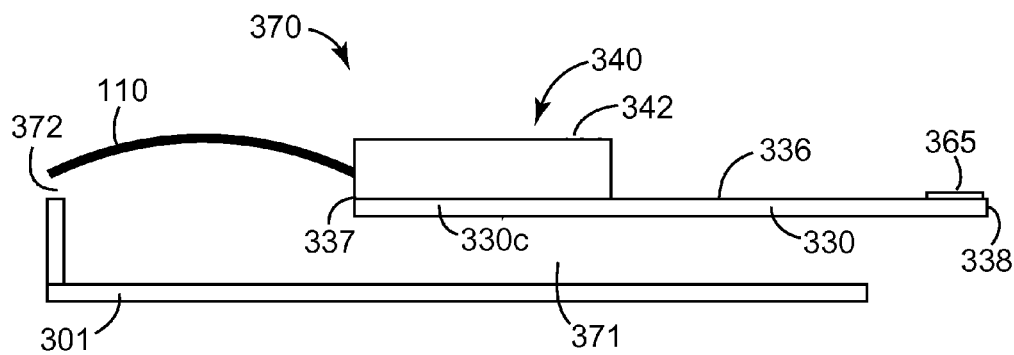

In yet other implementations, as depicted in FIG. 5E, a platform may not be used, or may be used in conjunction with placement of the portion of the transceiver 340 to which the optical fiber 110 is attached close to the edge 337 of the PCB 330. For example, the portion of the transceiver 340 may be placed within about 15 mm of the PCB edge. Placement of the transceiver 340 close to the edge limits the possibility of abrasion of the optical fiber by the PCB 330.

Figure 5F:
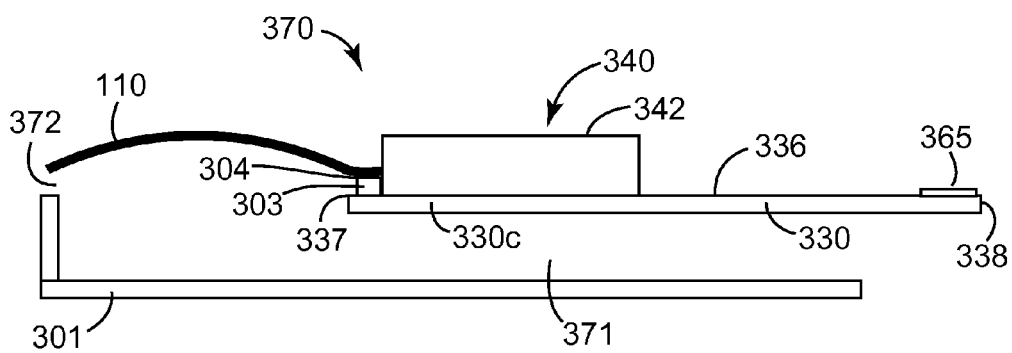

In some embodiments, the optical fibers 110 may be bonded to a feature 303 that is positioned just in front of the transceiver 340. FIG. 5F shows the feature 303 positioned on the circuit board 330, however, the feature 303 may be formed as a part of the housing 370. For example, the feature 303 can be supported by the lower wall 379 of the bottom housing portion 370 or can be supported by the side walls. The bonding may be accomplished by placing adhesive 304 on the fibers 110 and/or between the fibers 110 and the feature 303.

In some cases, as seen in FIGS. 3 and 4, the structure 375 may also include one or more platform sidewalls 377. For example, the connector housing 370 may include opposing sidewalls 377 disposed within the housing cavity 371 on either side of the platform surface 376. The platform sidewalls 377 extend along a length of the housing 370 of the plug connector and, in some cases, diverge from each other along a direction away from the platform surface 376. When present in the connector housing, the optical fibers 110 are arranged in a space between the sidewalls 377, as shown in FIG. 4.

The optical fibers discussed herein may be single-mode or multimode optical fibers. Single-mode optical fibers are designed to carry only a single ray of light having a single mode. Multimode optical fibers are designed to carry multiple light rays or modes concurrently, each ray having a slightly different reflection angle within the optical fiber core. Multimode optical fibers generally have a larger core than single mode fibers and have been used over shorter ranges than single mode fibers. Although a ray travels parallel to the length of the fiber, it can be referred to as a transverse mode ray if the electromagnetic vibrations of the ray are perpendicular to the length of the optical fiber. The optical fibers discussed herein may carry multiple transverse mode rays or a single transverse mode rays, for example.

As previously discussed, the transceiver is configured to convert electrical signals to optical signals and/or to convert optical signals to electrical signals. Conversion of electrical signals to optical signals can be achieved using a light emitting device, such as a light emitting diode or laser. For example, lasers configured to emit multiple transverse modes can be coupled to the optical fibers, for example.

Figure 6:
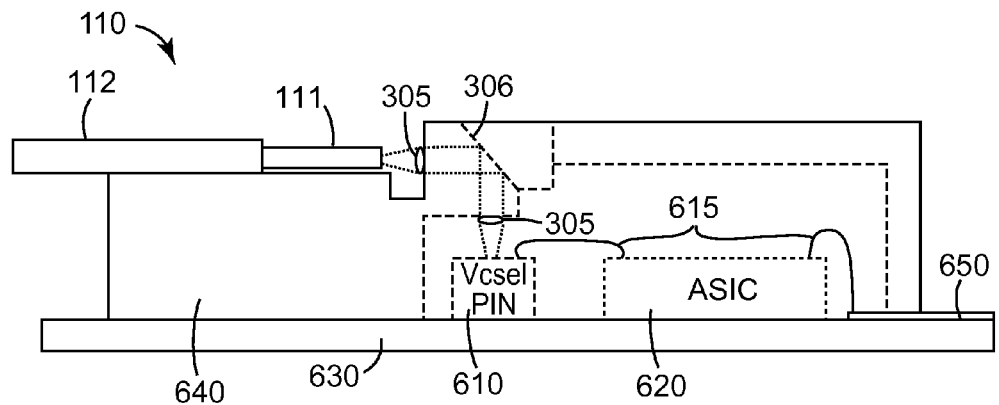
FIG. 6 illustrates some aspects of an electrical to optical conversion operation of the optoelectronic component in accordance with embodiments described herein.

FIG. 6 illustrates the electrical to optical conversion operation of the transceiver 640 in more detail. The optoelectronic transceiver 640 of FIG. 6 includes a multi transverse mode laser such as a vertical cavity surface emitting laser (VCSEL), capable of generating multiple transverse modes and/or a corresponding light detection device such as a P-I-N diode. The VCSEL is a type of semiconductor laser diode with laser light emission perpendicular to a top surface of the semiconductor layers, as opposed to laser diodes that emit light along the edge of the layers, e.g., in a direction parallel to a plane of the semiconductor layers. The electrically conductive traces 650 carry electrical signals that can be converted by the laser to multiple transverse mode light rays. The multi-transverse mode light rays are carried by a multi-transverse mode optical fiber 611 as previously discussed.

The laser and/or P-I-N diode 610 are optically coupled to the waveguide portion 111 of the optical fiber 110 fiber 611. For example, the laser and/or P-I-N diode 610 may be optically coupled to the optical fiber 110 via a coupling arrangement that includes one or more lenses 305 and total internal reflection surface 306, as depicted in FIG. 6. Alternatively, the laser and/or P-I-N diode 610 may be optically and physically coupled to the optical fiber 110 via direct attachment, e.g., direct attachment by adhesive.

As depicted in FIG. 6, the laser and/or P-I-N diode 610 can be electrically coupled to an ASIC 620 via bond wires 615. Bond wires from the ASIC 620 are electrically coupled to the traces of the PCB 650. The electrically conductive traces 650 electrically connect the transceiver 340 with the edge connector pads 365 (see FIG. 3).

As previously discussed, some embodiments that provide for movement control of the optical fibers include one or more sets of opposing sidewalls that are shaped to control the movement of the optical fibers within the connector housing. For example, two sets of opposing sidewalls may be used to cooperatively control movement of the optical fibers.

FIGS. 3 and 4 illustrate a portion 370 of a plug connector housing, referred to herein as the bottom housing portion, that includes a set of bottom portion opposing outer sidewalls 378 and a bottom wall 379. The bottom wall 379 and the bottom portion outer sidewalls 378 define the bottom housing cavity 371.

Figure 7:
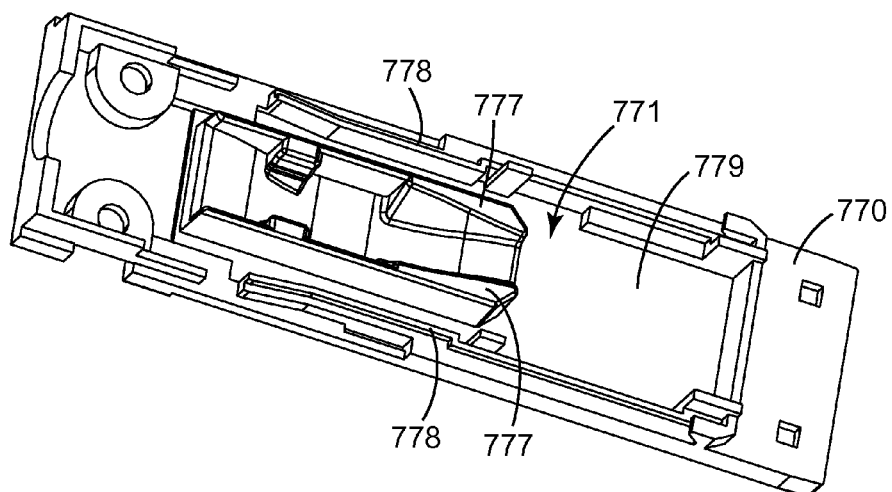
FIG. 7 illustrates a top portion of the plug connector housing in accordance with some embodiments.

FIG. 7 illustrates a portion 770 of the plug connector housing, referred to herein as a top portion, that includes top portion outer sidewalls 778 and a top wall 779. The top portion outer sidewalls 778 and the top wall 779 define the top housing cavity 771. As shown in FIG. 7, the top housing 770 includes a second set of opposing inner sidewalls 777 that extend downward from the top wall 779 of the top housing 770.

The bottom housing 370 and top housing 770 are two housing portions that fit together to form the plug connector housing. When the two housing portions 370, 770 fit together, the connector housing includes outer sidewalls comprising the top portion outer sidewalls 778 and the lower portion outer sidewalls 378. The connector sidewalls 778, 378 along with the top wall 779 and bottom wall 379 form the housing cavity that includes the bottom housing cavity 371 and the top housing cavity 771. As illustrated in FIG. 4, a PCB 330 having an optoelectronic component 340 mounted thereon may be disposed within the housing cavity formed by the top and bottom cavities 371, 771. As may be best seen in FIG. 3, the PCB includes a first plurality of electrical contacts 365 arranged proximate a mating edge 338 of the PCB 330. The electrical contacts 365 are electrically coupled to the optoelectronic component 340 and facilitate mating with a receptacle connector.

When optical fibers 110 are present within the housing, as illustrated in FIG. 4, they extend along a length of the housing from the housing opening 372 to the optoelectronic component 340 and are optically coupled to the optoelectronic component 340. In some cases, the optical fibers 110 are directly attached to the optoelectronic component, e.g., adhesively attached.

In some implementations, the bottom housing 370 includes first opposing inner sidewalls 377 that extend upward from the bottom 379 of the bottom housing 370. Note that the structure 375 shown in FIGS. 3 and 4 may or may not be used in conjunction with the sidewalls 377. In other words, the structure 375 may be used without the sidewalls 377, or the structure 375 may be used with the sidewalls 377, or in some configurations, as depicted in FIGS. 3 and 4, the structure 375 and the sidewalls 377 may be used together.

As previously discussed, the first opposing inner side walls 377 (see, FIGS. 3 and 4) are disposed in the bottom housing cavity 371 on the bottom wall 379 between the outer side walls 378. The first opposing inner sidewalls 377 diverge from each other in a direction from the bottom wall to the top wall. The connector includes second opposing inner sidewalls 777 (see, FIG. 7) disposed in the optical cavity 771 on the top wall between the opposing outer side walls 778. The second opposing inner sidewalls 777 diverge from each other in a direction from the top wall 779 to the bottom wall 379. When the top and bottom portions 370, 770 are assembled together, the first opposing inner sidewalls 377 and the second opposing inner sidewalls 777 form a guiding space therebetween. When optical fibers 110 are present in the connector cavity, the optical fibers are disposed within the guiding space formed by the first inner sidewalls 377 and the second inner sidewalls 777. The guiding space is configured to control the motion of the optical fibers.

Note that in some embodiments, the first opposing inner side walls are used without the second opposing inner sidewalls; in some embodiments, the second opposing inner sidewalls are used without the first opposing inner sidewalls; and in some embodiments, both first and second opposing inner sidewalls are used together. In some configurations, the first opposing inner sidewalls overlap the second opposing inner sidewalls, or vice versa. In some embodiments, the second opposing inner sidewalls are displaced from the second opposing inner sidewalls longitudinally along the housing.

FIG. 8 provides a view of the optical fiber connector including the bottom housing portion 370, the top housing portion 770, and the optical fiber cable 100. When the connector is assembled, the outer sidewalls 778 of the top housing 770 fit with the outer sidewalls 378 of the bottom housing 370 to form the outer sidewalls of the connector.

The electrical contacts 365 at the mating edge 338 of the PCB 330 can be seen in FIG. 8.

Figure 9:
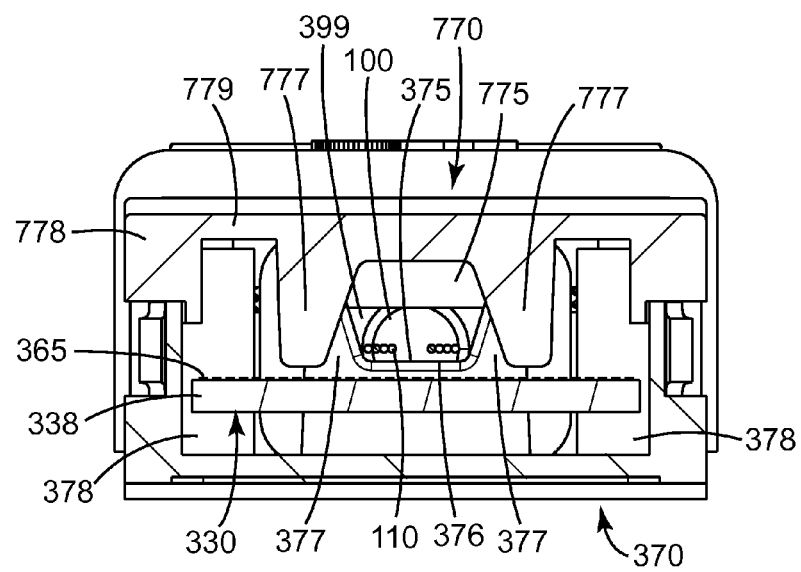
FIG. 9 provides a mating end view of the connector housing including the top and bottom housing portions according to some embodiments.

FIG. 9 provides a mating end view of the connector housing including the top 770 and bottom 370 housing portions. From the mating end of the connector, the mating edge 338 of the PCB 330 can be observed as well as the electrical contacts 365 arranged proximate to the mating edge 338. The top housing portion 770 includes outer sidewalls 778 and the top wall 779. The bottom housing portion 370 includes bottom outer sidewalls 378 and bottom wall 379. The top housing opposing outer sidewalls 778 and the bottom portion outer sidewalls 378 fit together to form the outer sidewalls of the connector housing.

Figure 10:
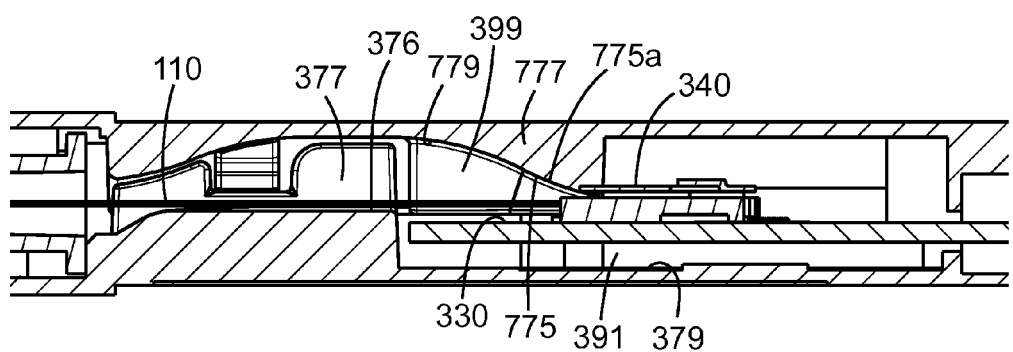
FIG. 10 shows second opposing inner sidewalls extending along a length of the housing between the housing opening and the optoelectronic component as described in various embodiments.

The bottom housing 370 includes first opposing inner sidewalls 377 disposed in the housing cavity between the opposing outer side walls 378 and on the bottom wall 379. As shown, for example, in FIGS. 3 and 4, the first opposing inner sidewalls 377 extend along a length of the housing between the housing opening 372 and the PCB 330. The first opposing inner sidewalls 377 diverge from each other in a direction from the bottom wall 379 to the top wall 779. The top housing 770 includes second opposing inner sidewalls 777 disposed between the opposing outer side walls 778 and on the top wall 779. As can be seen in FIG. 10, the second opposing inner sidewalls 777 extend along a length of the housing between the housing opening 372 and the optoelectronic component 340. The second opposing inner sidewalls 777 diverge from each other in a direction from the top wall 779 to the bottom wall 379. The first and second opposing inner sidewalls 377, 777 together define a guiding space 399 between them. The optical fiber cable 100 can be seen in FIG. 9 along with the plurality of individual optical fibers 110. The optical fibers 110 are disposed within the guiding space 399.

FIG. 10 provides a cross section view along the longitudinal axis of the connector of FIG. 8. The first opposing inner sidewalls 377 and the second opposing inner side walls 777 are offset from each other along the longitudinal axis of the connector. The first opposing inner sidewalls 377 are closer to the housing opening 372 than the second opposing inner sidewalls 777 and second opposing inner sidewalls 777 are closer to the mating edge 338 of the PCB 330 and the optoelectronic component 340 than the first opposing inner sidewalls 377. The first opposing inner sidewalls 377 extend along a length of the housing between the housing opening (see, 372, FIG. 3) and the PCB 330. The second opposing inner sidewalls 777 extend along the length of the housing between the housing opening 372 and the optoelectronic component 340. FIG. 10 shows the optoelectronic component 340 disposed on the top surface of the PCB 330. The optical fibers 110 float in the housing cavity 391 in the guiding space 399 formed by the first and second opposing inner sidewalls 377, 777.

The first and second opposing inner sidewalls 377, 777 are arranged so that when an optical fiber 110 expands or moves within the housing cavity 395, the first and second opposing inner sidewalls 377, 777 cooperatively guide the optical fiber 110 towards the top wall 779 of the housing.

As shown in FIG. 10, for example, in some cases, the first opposing inner sidewalls 377 may terminate at a first surface 376 that is raised relative to an inner side of the bottom wall 379 of the housing. The first surface 376 has a planar portion extending below and parallel to the optical fibers 110. The second opposing inner sidewalls 777 can terminate at a second surface 775 disposed on an inner side of the top wall 779 of the housing. The second surface 775 may have a curved portion 775a that curves along the plurality of optical fibers 110. For example, in some cases, the radius of curvature of the curved portion 775*a* of the second surface 775 is greater than a minimum rated radius of curvature for the optical fibers 110, e.g., greater than a radius of curvature of about 15 mm.

Figure 11:
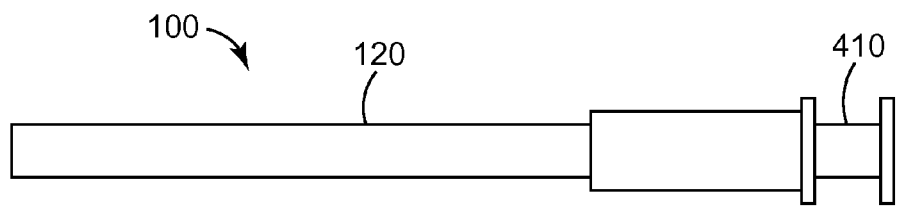
FIG. 11 is a diagram that shows an optical fiber cable that includes a strain relief bushing which is attached to the cable and constrains longitudinal movement of the outer jacket but does not constrain longitudinal movement of the individual optical fibers in accordance with various embodiments.

In some embodiments movement control encompasses strain relief for optical fibers disposed with the outer jacket of the optical fiber cable. These strain relief approaches may be used alternatively, or in addition to the movement control structures previously discussed. With reference to FIGS. 1A and 1B, an optical fiber cable 100 may include at least one, e.g., only one or a plurality of, optical fibers 110 within the optical fiber cable 100. The at least one optical fiber may be moveable within the outer jacket 120 along a longitudinal axis of the cable 100. As best seen in FIGS. 4 and 11, the optical fiber cable 100 includes a strain relief bushing 410 that is attached to the cable and constrains longitudinal movement of the outer jacket 120 but does not constrain longitudinal movement of the individual optical fibers. The strain relief bushing may be attached to the cable outer jacket by adhesive, by crimping, or other techniques.

The strain relief bushing 410 is arranged within the housing so that the cable 100 enters the housing through the housing opening 372. When top and bottom housing portions 370, 770 are fastened together, e.g., by screws 411, the cable 100 is held to the housing via the bushing. The outer jacket 120 of the cable is prevented from moving along a longitudinal axis of the cable, however, each of the one or more optical fibers 110 disposed within the jacket 120 is moveable along the longitudinal axis of the cable within the outer jacket 120. Thus, when up to a maximum rated cable load, e.g., 90 Newtons is applied to the cable along the longitudinal axis, each of optical fibers 110 disposed within the cable jacket 120 experiences substantially zero tensile stress. Substantially zero tensile stress involves the situation where there remains some, possibly small, amount of arc in the path of an optical fiber. The cable does not exert any substantial pull on the optical fibers and thus on the optoelectronic component to which the optical fibers are connected. For example, substantially zero tensile stress occurs when each optical fiber in a cable experiences a tensile force of less than 2 pounds, or less than 1 pound, or less than 0.5 pounds, or even less than 0.2 pounds.

It will be appreciated that the strain relief bushing is described above as a possible way to constrain the cable along the longitudinal axis while allowing at least one optical fiber disposed within the cable jacket to move within the jacket along the longitudinal axis of the cable. Various other structures other than the bushing may be used, e.g., such as by attaching the outer jacket to the housing. In some configurations, the optical fibers are fixed to the outer jacket 120 somewhere along the length of the cable 100, e.g., midway between two connectors disposed at either end of the cable 100. Fixing the optical fibers to the cable jacket help prevent the one or more of the fibers from moving towards one or both sides of the connector housing, and then potentially applying a tensile stress on the one optoelectronic component. Fixing the optical fibers to the cable jacket could be achieved by injecting adhesive into the cable at mid-span and/or elsewhere along the cable length and curing the adhesive.

Item 1 is a plug connector for connecting optical fibers to an electrical receptacle connector, comprising:
a printed circuit board (PCB) comprising a plurality of electrical contacts disposed proximate a mating edge of the PCB for mating with the receptacle connector;
a transceiver disposed in the housing cavity, the transceiver comprising one or more optoelectronic components disposed on a surface of the PCB and electrically connected to the plurality of electrical contacts;
a housing, comprising:
a cavity;
a housing opening: and
a platform disposed within the housing cavity between the housing opening and the PCB, the platform comprising a top surface;
one or more optical fibers entering the housing cavity through the housing opening and being optically coupled to the optoelectronic components, the plurality of the optical fibers extending above the top surface of the platform and along at least a portion of the top surface of the PCB, the plurality of the optical fibers being separated from the top surface of the PCB by a first minimum distance and from the top surface of the platform by a second minimum distance which is less than the first minimum distance.

Item 2 is the plug connector of item 1, wherein the second minimum distance is less than the first minimum distance when the optical fibers are arranged in a substantially flat configuration.

Item 3 is the plug connector of item 1, wherein the housing is configured to allow some amount of movement of the optical fibers within the housing cavity while constraining a maximum movement of the optical fibers.

Item 4 is the plug connector of item 1, wherein when an optical fiber of the one or more optical fibers expands toward the top surfaces of the platform and the PCB, the optical fiber contacts the top surface of the platform before the optical fiber contacts an edge of the PCB closest to the platform.

Item 5 is the plug connector of item 4, wherein the edge of the PCB closest to the platform is opposite the mating edge of the PCB.

Item 6 is the plug connector of item 1, wherein the optical fibers in the plurality of optical fibers float within the housing cavity between the housing opening and the optoelectronic components.

Item 7 is the plug connector of item 1, wherein the housing further comprises opposing side walls disposed in the housing cavity and on either side of the top surface of the platform, the opposing side walls extending along a length of the plug connector and diverging from each other along a direction away from the top surface of the platform, the optical fibers being disposed in a space defined between the opposing side walls.

Item 8 is the plug connector of item 1, wherein the optoelectronic component is adapted to convert an optical signal to an electrical signal and an electrical signal to an optical signal.

Item 9 is the plug connector of item 1, wherein the optical fibers in the plurality of optical fibers are multi-transverse-mode optical fibers.

Item 10 is an optoelectronic system comprising:
the plug connector of item 1, wherein the optical fibers in the plurality of optical fibers are multi-transverse-mode optical fibers;
a multi-transverse-mode laser configured to emit light into at least some of the optical fibers in the plurality of optical fibers.

Item 11 is the optoelectronic system of item 8, wherein laser is a vertical cavity surface emitting laser.

Item 12 is a plug connector for connecting an optical fiber to an electrical receptacle connector, comprising:

a housing defining a cavity therein and having a housing opening;

a printed circuit board (PCB) disposed in the housing cavity one or more optoelectronic components disposed on the PCB; and a cable entering the housing cavity through the housing opening and being optically coupled to the optoelectronic components, the cable comprising:

one or more optical fibers, each optical fiber comprising a core surrounded by a cladding; and an outer jacket surrounding the one or more optical fibers; the outer jacket being attached to the housing at the housing opening such that the outer jacket, but not the at least one optical fiber, is prevented from moving along a longitudinal axis of the cable.

Item 13 is the plug connector of item 11, wherein when the cable is pulled with a maximum rated cable load along a longitudinal axis of the cable, each optical fiber of the one or more optical fibers experiences substantially zero tensile stress.

Item 14 is the plug connector of item 13, wherein the optical fiber of the one or more optical fibers experiences substantially zero tensile stress when the cable is pulled with a maximum rated cable load along the longitudinal axis of the cable and the optical fiber experiences less than 2 pounds of tensile force.

Item 15 is the plug connector of item 11, wherein the at least one optical fiber floats within the housing cavity between the housing opening and the optoelectronic components.

Item 16 is the plug connector of item 11, wherein the outer jacket is attached to the housing at the housing opening such that the outer jacket, but not the optical fibers, is prevented from moving along a longitudinal axis of the cable.

Item 17 is the plug connector of item 16, such that when the cable is pulled with a maximum rated cable load along the longitudinal axis of the cable, the optical fibers in the plurality of optical fibers experience substantially zero tensile stress.

Item 18 is the plug connector of item 11, wherein the one or more optoelectronic components are disposed on a top surface of the PCB.

Item 19 is a plug connector for connecting optical fibers to a receptacle connector, comprising:

a housing comprising opposing top and bottom walls and opposing outer side walls, the top, bottom and outer side walls defining a cavity therebetween;

a printed circuit board (PCB) disposed in the housing cavity and comprising:

at least one optoelectronic component; and a first plurality of electrical contacts disposed proximate a mating edge of the PCB for mating with the receptacle connector, the first plurality of electrical contacts being electrically connected to the optoelectronic component;

a plurality of optical fibers disposed in the housing cavity and extending along a length of the housing from a housing opening to the optoelectronic component, the plurality of optical fibers being optically coupled to the optoelectronic component;

first opposing inner side walls disposed in the housing cavity between the opposing outer side walls and on the bottom wall, the first opposing inner side walls diverging from each other in a direction from the bottom wall to the top wall; and second opposing inner side walls disposed in the housing cavity between the opposing outer side walls and on the top wall, the second opposing inner side walls diverging from each other in a direction from the top wall to the bottom wall, the first opposing inner side walls overlapping the second opposing inner side walls, the first and second opposing inner side walls defining a guiding space therebetween, the plurality of the optical fibers being disposed in the guiding space.

Item 20 is the plug connector of item 19, wherein the optical fibers in the plurality of optical fibers float in the housing cavity between an opening of the housing and the optoelectronic component.

Item 21 is the plug connector of item 19, wherein the optoelectronic component is disposed on a top surface of the PCB.

Item 22 is the plug connector of item 19, wherein when a fiber in the plurality of optical fibers expands in the housing cavity, the first and second opposing side walls cooperatively guide the expanding optical fiber towards the top wall of the housing.

Item 23 is the plug connector of item 19, wherein the first opposing inner side walls terminate at a first surface raised relative to an inner side of the bottom wall of the housing, the first surface having a planar portion extending below and parallel to the optical fibers in the plurality of the optical fibers.

Item 24 is the plug connector of item 19, wherein the first opposing inner side walls extend along the length of the housing between the housing opening and the PCB.

Item 25 is the plug connector of item 19, wherein the second opposing inner side walls extend along the length of the housing between the housing opening and the optoelectronic component.

Item 26 is the plug connector of item 19, wherein the second opposing inner side walls terminate at a second surface disposed on an inner side of the top wall of the housing, the second surface having a curved portion curving along the plurality of the optical fibers.

Item 27 is the plug connector of item 26, wherein a radius of curvature of the curved portion of the second surface is greater than a minimum bend radius of curvature for the optical fibers in the plurality of the optical fibers.

The embodiments discussed in this disclosure have been illustrated and described herein for purposes of description of preferred embodiments, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electro-mechanical, and electrical arts will readily appreciate that the disclosed embodiments may be implemented with vary wide variations. This application is intended to cover any adaptations or variations of the preferred embodiments discussed herein.

The invention claimed is:

1. A plug connector for connecting optical fibers to a receptacle connector, comprising:

a housing comprising opposing top and bottom walls and opposing outer side walls, the top, bottom and outer side walls defining a cavity therebetween;

a printed circuit board (PCB) disposed in the housing cavity and comprising:

at least one optoelectronic component; and a first plurality of electrical contacts disposed proximate a mating edge of the PCB for mating with the receptacle connector, the first plurality of electrical contacts being electrically connected to the optoelectronic component;

a plurality of optical fibers disposed in the housing cavity and extending along a length of the housing from a housing opening to the optoelectronic component, the plurality of optical fibers being optically coupled to the optoelectronic component;

first opposing inner side walls disposed in the housing cavity between the opposing outer side walls and on the bottom wall, the first opposing inner side walls diverging from each other in a direction from the bottom wall to the top wall; and second opposing inner side walls disposed in the housing cavity between the opposing outer side walls and on the top wall, the second opposing inner side walls diverging from each other in a direction from the top wall to the bottom wall, the first opposing inner side walls overlapping the second opposing inner side walls, the first and second opposing inner side walls defining a guiding space therebetween, the plurality of the optical fibers being disposed in the guiding space.

2. The plug connector of claim 1, wherein the optical fibers in the plurality of optical fibers float in the housing cavity between an opening of the housing and the optoelectronic component.

3. The plug connector of claim 1, wherein the optoelectronic component is disposed on a top surface of the PCB.

4. The plug connector of claim 1, wherein when a fiber in the plurality of optical fibers expands in the housing cavity, the first and second opposing side walls cooperatively guide the expanding optical fiber towards the top wall of the housing.

5. The plug connector of claim 1, wherein the first opposing inner side walls terminate at a first surface raised relative to an inner side of the bottom wall of the housing, the first surface having a planar portion extending below and parallel to the optical fibers in the plurality of the optical fibers.

6. The plug connector of claim 1, wherein the first opposing inner side walls extend along the length of the housing between the housing opening and the PCB.

7. The plug connector of claim 1, wherein the second opposing inner side walls extend along the length of the housing between the housing opening and the optoelectronic component.

8. The plug connector of claim 1, wherein the second opposing inner side walls terminate at a second surface disposed on an inner side of the top wall of the housing, the second surface having a curved portion curving along the plurality of the optical fibers.

9. The plug connector of claim 8, wherein a radius of curvature of the curved portion of the second surface is greater than a minimum bend radius of curvature for the optical fibers in the plurality of the optical fibers.

10. A plug connector for connecting optical fibers to an electrical receptacle connector, comprising:

a printed circuit board (PCB) comprising a plurality of electrical contacts disposed proximate a mating edge of the PCB for mating with the receptacle connector;

a housing defining a housing cavity therein, the PCB disposed in the housing cavity, the housing comprising:
a housing opening; and
a platform disposed within the housing cavity between the housing opening and the PCB, the platform comprising a top surface;

a transceiver disposed in the housing cavity, the transceiver comprising one or more optoelectronic components disposed on a surface of the PCB and electrically connected to the plurality of electrical contacts;

one or more optical fibers entering the housing cavity through the housing opening and being optically coupled to the optoelectronic components, the plurality of the optical fibers extending above the top surface of the platform and along at least a portion of the top surface of the PCB, the plurality of the optical fibers being separated from the top surface of the PCB by a first minimum distance and from the top surface of the platform by a second minimum distance which is less than the first minimum distance.

11. The plug connector of claim 10, wherein the second minimum distance is less than the first minimum distance when the optical fibers are arranged in a substantially flat configuration.

12. The plug connector of claim 10, wherein the housing is configured to allow some amount of movement of the optical fibers within the housing cavity while constraining a maximum movement of the optical fibers.

13. The plug connector of claim 10, wherein when an optical fiber of the one or more optical fibers expands toward the top surfaces of the platform and the PCB, the optical fiber contacts the top surface of the platform before the optical fiber contacts an edge of the PCB closest to the platform.

14. The plug connector of claim 13, wherein the edge of the PCB closest to the platform is opposite the mating edge of the PCB.

15. The plug connector of claim 10, wherein the optical fibers in the plurality of optical fibers float within the housing cavity between the housing opening and the optoelectronic components.

16. The plug connector of claim 10, wherein the housing further comprises opposing side walls disposed in the housing cavity and on either side of the top surface of the platform, the opposing side walls extending along a length of the plug connector and diverging from each other along a direction away from the top surface of the platform, the optical fibers being disposed in a space defined between the opposing side walls.

17. The plug connector of claim 10, wherein the optoelectronic component is adapted to convert an optical signal to an electrical signal and an electrical signal to an optical signal.

18. The plug connector of claim 10, wherein the optical fibers in the plurality of optical fibers are multi-transverse-mode optical fibers.

19. An optoelectronic system comprising:
the plug connector of claim 10, wherein the optical fibers in the plurality of optical fibers are multi-transverse-mode optical fibers;
a multi-transverse-mode laser configured to emit light into at least some of the optical fibers in the plurality of optical fibers.

20. The optoelectronic system of claim 19, wherein the laser is a vertical cavity surface emitting laser.

21. The plug connector of claim 10, wherein an edge of the PCB closest to the platform is opposite the mating edge of the PCB and the plurality of electrical contacts are disposed in a row adjacent the mating edge.

22. A plug connector for connecting an optical fiber to an electrical receptacle connector, comprising:
a housing defining a cavity therein and having a housing opening;

a printed circuit board (PCB) disposed in the housing cavity;

one or more optoelectronic components disposed on the PCB; and a cable entering the housing cavity through the housing opening and being optically coupled to the optoelectronic components, the cable comprising:

one or more optical fibers, each optical fiber comprising a core surrounded by a cladding; and an outer jacket surrounding the one or more optical fibers;

the outer jacket being attached to the housing at the housing opening such that the outer jacket, but not the at least one optical fiber, is prevented from moving along a longitudinal axis of the cable, wherein the housing further comprises:

a platform disposed within the housing cavity between the housing opening and the PCB, the platform comprising a top surface; and opposing side walls disposed in the housing cavity and on either side of the top surface of the platform, the opposing side walls extending along a length of the plug connector and diverging from each other along a direction away from the top surface of the platform, the optical fibers being disposed in a space defined between the opposing side walls.

23. The plug connector of claim 22, wherein the one or more optoelectronic components are disposed on a top surface of the PCB.

24. The plug connector of claim 22, wherein the one or more optical fibers floats within the housing cavity between the housing opening and the optoelectronic components.

25. The plug connector of claim 22, wherein when the cable is pulled with a maximum rated cable load along a longitudinal axis of the cable, each optical fiber of the one or more optical fibers experiences substantially zero tensile stress.

26. The plug connector of claim 25, wherein the optical fiber of the one or more optical fibers experiences substantially zero tensile stress when the cable is pulled with a maximum rated cable load along the longitudinal axis of the cable and the optical fiber experiences less than 2 pounds of tensile force.

* * * * *